United States Patent
Yu et al.

(10) Patent No.: US 11,829,040 B2
(45) Date of Patent: Nov. 28, 2023

(54) COLOR FILM SUBSTRATE COMPRISING A SUPPORT LAYER DISPOSED ON A SIDE OF A PLANARIZATION LAYER AWAY FROM A BASE IN A NON-DISPLAY REGION AND DISPLAY DEVICE

(71) Applicants: HEFEI BOE DISPLAY TECHNOLOGY CO., LTD., Anhui (CN); BOE TECHNOLOGY GROUP CO., LTD., Beijing (CN)

(72) Inventors: Xianshu Yu, Beijing (CN); Lei Guo, Beijing (CN)

(73) Assignees: HEFEI BOE DISPLAY TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/930,757

(22) Filed: Sep. 9, 2022

(65) Prior Publication Data
US 2023/0013193 A1    Jan. 19, 2023

Related U.S. Application Data

(63) Continuation of application No. 16/962,824, filed as application No. PCT/CN2020/070432 on Jan. 6, 2020, now Pat. No. 11,474,402.

(30) Foreign Application Priority Data

Feb. 2, 2019    (CN) .......................... 201920188064.7

(51) Int. Cl.
*G02F 1/1362* (2006.01)
(52) U.S. Cl.
CPC .. *G02F 1/136222* (2021.01); *G02F 1/136209* (2013.01)

(58) Field of Classification Search
None
See application file for complete search history.

(56) References Cited

U.S. PATENT DOCUMENTS

2004/0209008 A1    10/2004    Liang et al.
2011/0181816 A1*   7/2011    Kang ................ G02F 1/133345
                                                    257/E21.211

(Continued)

FOREIGN PATENT DOCUMENTS

| CN | 103149729 A | 6/2013 |
| CN | 104777666 A | 7/2015 |

(Continued)

OTHER PUBLICATIONS

International Search Report and Written Opinion relating to PCT/CN2020/070432, filed Jan. 6, 2020; dated Apr. 2, 2020.

(Continued)

*Primary Examiner* — Paul C Lee
(74) *Attorney, Agent, or Firm* — DINSMORE & SHOHL LLP (57) ABSTRACT

The present application provides a color film substrate, a display device, and a color film substrate fabricating method. The color film substrate comprises a display region and a non-display region, wherein the color film substrate in the non-display region comprises: a base; and a photoresist layer disposed on the base; a planarization layer disposed on a side of the photoresist layer away from the base; a support layer disposed on a side of the planarization layer away from the base; wherein a total thickness of the photoresist layer, the planarization layer, and the support layer is greater than or equal to a first thickness threshold.

19 Claims, 4 Drawing Sheets

(56) References Cited

U.S. PATENT DOCUMENTS

2016/0202570 A1    7/2016   Liu et al.
2017/0255054 A1    9/2017   Li
2018/0088405 A1*   3/2018   Nagasawa ......... G02F 1/133512

FOREIGN PATENT DOCUMENTS

| CN | 106256955 A | | 12/2016 | |
|---|---|---|---|---|
| CN | 109557709 A | | 4/2019 | |
| CN | 209590464 U | | 11/2019 | |
| CN | 110945581 B | * | 1/2022 | ............. B32B 27/12 |
| JP | 2008158138 A | | 7/2008 | |
| JP | 3200298 U | * | 10/2015 | ....... G02F 1/133512 |

OTHER PUBLICATIONS

Non-Final Office Action dated Mar. 3, 2022 relating to U.S. Appl. No. 16/962,824, filed Jul. 16, 2020.
Notice of Allowance dated Jun. 14, 2022, relating to U.S. Appl. No. 16/962,824, filed Jul. 16, 2020.

* cited by examiner

COLOR FILM SUBSTRATE COMPRISING A SUPPORT LAYER DISPOSED ON A SIDE OF A PLANARIZATION LAYER AWAY FROM A BASE IN A NON-DISPLAY REGION AND DISPLAY DEVICE

The subject patent application is a continuation of, and claims priority to, U.S. patent application Ser. No. 16/962,824, which is a U.S. National Stage under 35 U.S.C. § 371 of International Application No. PCT/CN2020/070432, as filed on Jan. 6, 2020, which claims the benefit of priority to the Chinese patent application No. 201920188064.7 entitled "A COLOR FILM SUBSTRATE AND A DISPLAY DEVICE" and filed on Feb. 2, 2019. The disclosure of each of these applications is hereby incorporated by reference in its entirety into the present application for all purposes.

TECHNICAL FIELD

The present disclosure relates to the technical field of display, and particularly a color film substrate, a display device and a color film substrate fabricating method.

BACKGROUND

With the development of the large-size display screen technology, the consumption level of people rises ceaselessly, and large-size TV (television) products are favored by more and more consumers.

However, after the large-size screens are combined into a TV product, uneven stress easily occurs on the periphery of the product. The screens will be deformed due to uneven stress, resulting in light leakage on the periphery under a dark state. Poor light leakage frequently occurs at the client, which seriously influences the user experience, thus an effective solution to solve the light leakage problem on the periphery is needed.

SUMMARY

According to some embodiments, the present disclosure discloses a color film substrate comprising a display region and a non-display region, wherein the color film substrate in the non-display region comprises: a base; and a photoresist layer disposed on the base;
 a planarization layer disposed on a side of the photoresist layer away from the base;
 a support layer disposed on a side of the planarization layer away from the base;
 wherein a total thickness of the photoresist layer, the planarization layer, and the support layer is greater than or equal to a first thickness threshold.

Alternatively, the photoresist layer includes a light shielding layer and a color resist layer stacked on the base, wherein the light shielding layer is disposed close to the base.

Alternatively, the color resist layer includes a red color resist layer, a green color resist layer, and a blue color resist layer.

Alternatively, a thickness of the color resist layer is greater than or equal to 1.5 µm, and less than or equal to 2.5 µm.

Alternatively, a thickness of the light shielding layer is greater than or equal to 0.8 µm, and less than or equal to 1.6 µm.

Alternatively, a thickness of the planarization layer is greater than or equal to 0.5 µm, and less than or equal to 1.5 µm.

Alternatively, a thickness of the support layer is greater than or equal to 1 µm, and less than or equal to 2.5 µm.

Alternatively, the color film substrate in the display region comprises: the base, a color resist layer disposed on the base, a planarization layer disposed on a side of the color resist layer away from the base, and a support layer disposed on a side of the planarization layer away from the base, wherein the first thickness threshold value is equal to a total thickness of the color resist layer, the planarization layer and the support layer of the color film substrate in the display region, minus 1.1 µm.

According to some embodiments, the present disclosure further discloses a display device comprising an array substrate and the above-described color film substrate, which are arranged in a cell aligned manner, and a liquid crystal layer filled between the array substrate and the color film substrate.

Alternatively, a distance between the array substrate and a surface on a side of the planarization layer of the color film substrate in the non-display region away from the base is greater than or equal to the thickness of the support layer, and less than or equal to a second thickness threshold, wherein the second thickness threshold is less than or equal to 2.5 µm.

Alternatively, a distance between the array substrate and a surface on a side of the support layer of the color film substrate in the non-display region away from the base is less than or equal to a third thickness threshold, wherein the third thickness threshold is less than 0.2 µm.

According to some embodiments, there is provided a method for fabricating a color film substrate, wherein the color film substrate comprises a non-display region and a display region, the method comprising: manufacturing on a base a light shielding layer for the non-display region, manufacturing on the light shielding layer a color resist layer for the non-display region, coating a planarization layer on the color resist layer, and manufacturing a support layer on the planarization layer.

Alternatively, manufacturing on the light shielding layer a color resist layer for the non-display region comprises: manufacturing on the light shielding layer one or more of a red color resist layer, a blue color resist layer, and a green color resist layer for the non-display region.

Alternatively, manufacturing on the light shielding layer a color resist layer for the non-display region comprises: after manufacturing on the light shielding layer a color resist layer for the display region, moving a mask of the color resist layer to the non-display region to manufacture on the light shielding layer the color resist layer for the non-display region.

Alternatively, a thickness of the light shielding layer, the photoresist layer, the planarization layer, and the support layer in the non-display region is greater than or equal to a first thickness threshold.

Alternatively, the color film substrate in the display region comprises: the base, a color resist layer disposed on the base, a planarization layer disposed on a side of the color resist layer away from the base, and a support layer disposed on a side of the planarization layer away from the base, wherein the first thickness threshold value is equal to a total thickness of the color resist layer, the planarization layer and the support layer of the color film substrate in the display region, minus 1.1 µm.

BRIEF DESCRIPTION OF THE DRAWINGS

To describe the technical solutions in the embodiments of the present disclosure more clearly, the accompanying drawings used in the description of the embodiments of the present disclosure are briefly introduced in the following. Obviously, the accompanying drawings in the following are only some embodiments of the present disclosure, and persons of ordinary skill in the art may also obtain other drawings according to these accompanying drawings without creative efforts.

DETAILED DESCRIPTION

In order to make the objectives, features, and advantages of the present invention clearer and more comprehensible, the present disclosure is further described in detail in the following with reference to the accompanying drawings and the embodiments.

The present application provides a color film substrate and a display device, wherein the color film substrate comprises a display region and a non-display region, wherein the color film substrate in the non-display region comprises: a base; and a photoresist layer disposed on the base; a planarization layer disposed on a side of the photoresist layer away from the base;

a support layer disposed on a side of the planarization layer away from the base; wherein a total thickness of the photoresist layer, the planarization layer, and the support layer is greater than or equal to a first thickness threshold. By increasing the thickness of the color film substrate in the non-display region, a peripheral cell thickness of the display panel formed by the color film substrate and the array substrate in a cell aligned manner is reduced, an amount of liquid crystal filled on the periphery is reduced, and a cell thickness difference between a stressed area and a non-stressed area of the display panel is reduced, thereby improving light leakage; in addition, the increase in the thickness of the color film substrate in the non-display region can reduce a gap between the support layer and the array substrate, improve the peripheral supporting force, enhance the deformation resistance of the display panel and improve the poor light leakage in the peripheral dark state.

Figure 1:
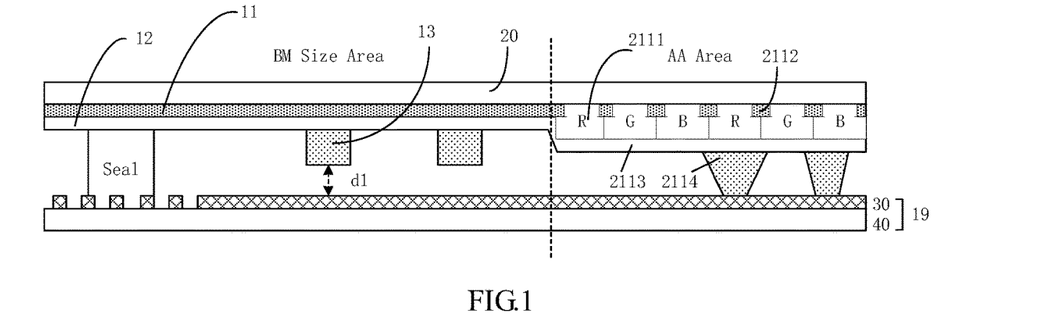
FIG. 1 is a schematic diagram illustrating a cross-sectional structure of a color film substrate provided in the related art.

A peripheral area (e.g., BM (Black Matrix) size area in FIG. 1) of a conventional color film substrate is a black matrix material layer 11, a protective OC (overcoat) layer 12, and a supporting spacer PS (spacer) layer 13 stacked on a base 20.

As shown in FIG. 1, the color film substrate in the display region comprises: a base 20; and a color resist layer 2111 (e.g., including arranged RGB color resist layers) disposed on the base 20. The base 20 is provided with a black matrix 2112. The color film substrate in the display region further comprises: a planarization layer 2113 disposed on a side of the color resist layer 2111 away from the base, and a support layer 2114 disposed on a side of the planarization layer 2113 away from the base.

The inventors found that a peripheral film thickness of the existing color film substrate is thinner, so that a spare volume of the formed peripheral BM Size area of the screen is larger, resulting in more liquid crystal filled on the periphery; meanwhile, a gap with d1 of about 1.1 μm exists between the PS layer 13 of the color film substrate in the BM Size area and the array substrate 19 (for example, including the base 40 and the thin film transistor layer 30), resulting in an insufficient peripheral supporting force; when an uneven stress occurs on the periphery of the screen, there is a larger deformation on the glass substrate, and the liquid crystal molecules are arranged in disorder, resulting in poor peripheral light leakage.

Figure 2A:
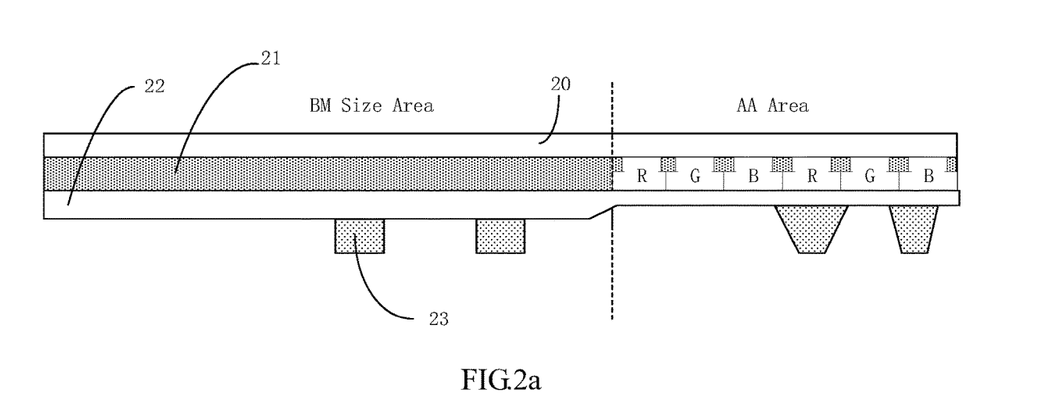
FIG. 2a is a schematic diagram illustrating a cross-sectional structure of a color film substrate provided in an embodiment of the present application.

In order to solve this problem, an embodiment of the present application provides a color film substrate comprising a display region (AA area) and a non-display region (BM Size area), as shown in FIG. 2a. The configuration of the display region is similar to that of FIG. 1, and is not repeated herein.

The color film substrate in the display region comprises: a base 20; and a color resist layer 2111 (e.g., including arranged RGB color resist layers) disposed on the base 20. The base 20 is provided with a black matrix 2112. The color film substrate in the display region further comprises: a planarization layer 2113 disposed on a side of the color resist layer 2111 away from the base and a support layer 2114 disposed on a side of the planarization layer 2113 away from the base.

The color film substrate in the non-display region comprises: the base 20; and a photoresist layer 21 disposed on the base 20; a planarization layer 22 disposed on a side of the photoresist layer 21 away from the base 20; a support layer 23 disposed on a side of the planarization layer 22 away from the base 20; wherein, a total thickness of the photoresist layer 21, the planarization layer 22 and the support layer 23 is greater than or equal to a first thickness threshold.

In some embodiments, the first thickness threshold is equal to a total thickness of the black matrix 2112, the planarization layer 2113, and the support layer 2114 in the display region.

In some embodiments, the first thickness threshold is equal to a total thickness of the color resist layer 2111, the planarization layer 2113, and the support layer 2114 of the color film substrate in the display region, minus 1.1 μm.

In some embodiments, the support layer in the non-display region and the support layer in the display region are formed in the same layer in the same manufacturing process, wherein a thickness of each spacer PS may be set according to actual needs.

The base 20 may be glass or a flexible substrate, etc.

The photoresist layer 21 may include only a light shielding layer (e.g., a black photoresist layer), and may also include a color resist layer (e.g., a color photoresist layer) disposed on a side of the light shielding layer away from the base 20, and etc.

The planarization layer 22 has functions of planarization and protection, and may be made of a resin material. The thickness of the planarization layer can be greater than or equal to 0.5 μm and less than or equal to 1.5 μm.

The support layer 23 may include PS dots or PS walls, and has a function of making the cell thickness uniform in the display panel, and it may be made of a resin material. The thickness of the support layer may be greater than or equal to 1 μm and less than or equal to 2.5 μm.

Figure 2B:
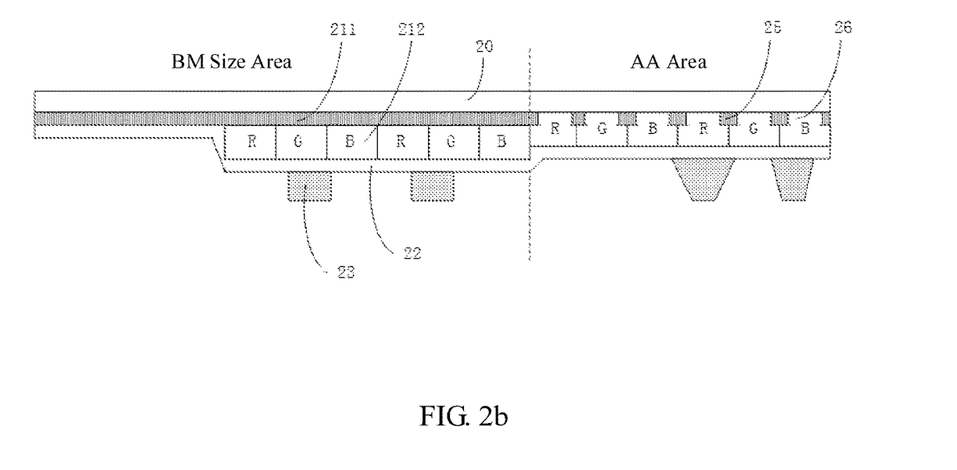
FIG. 2b is a schematic diagram illustrating a cross-sectional structure of another color film substrate provided in an embodiment of the present application.

In order to make the total thickness of the photoresist layer 21, the planarization layer 22 and the support layer 23 greater than or equal to the first thickness threshold, in one implementation, referring to FIG. 2a, when the photoresist layer is a light shielding layer, it can be implemented by increasing the thickness of the light shielding layer (i.e. the thickness of the light shielding layer in the BM Size area is greater than that in the AA area); in another implementation, referring to FIG. 2a, it can be implemented by increasing the thickness of the planarization layer (i.e. the thickness of the planarization layer in BM Size area is greater than that in AA area); in still another implementation, referring to FIG. 2b, it can be implemented by adding a color resist layer on the light shielding layer. In practical applications, these several implementations may also be combined arbitrarily. A value of the first thickness threshold may be set to reduce the amount of liquid crystal filled on the periphery of the display panel and improve the peripheral supporting force, and a specific value may be determined according to actual situations, which is not limited in the present embodiment.

According to the color film substrate provided by the present embodiment, by increasing the thickness of the color film substrate in the non-display region, the peripheral cell thickness of the display panel formed by the color film substrate and the array substrate in a cell-aligned manner is reduced, thereby reducing the amount of liquid crystal filled on the periphery, reducing the cell thickness difference between the stressed area and the non-stressed area of the display panel, and improving light leakage; in addition, the increase in the thickness of the color film substrate in the non-display region can reduce the gap between the support layer and the array substrate, improve the peripheral supporting force, enhance the deformation resistance of the display panel and improve the poor light leakage in the peripheral dark state.

In order to reduce the processing complexity and cost, referring to FIG. 2b, the photoresist layer 21 may include a light shielding layer 211 and a color resist layer 212 stacked on the base 20, wherein the light shielding layer 211 is disposed close to the base 20.

The color resist layer 212 may include a red color resist layer R, a green color resist layer G, and a blue color resist layer B. The number of the red color resist layer R, the green color resist layer G, and the blue color resist layer B included in the color resist layer may be set according to actual needs.

In this embodiment, the material and thickness of the light shielding layer 211 may be the same as those of the black matrix 25 in the AA area, so that the light shielding layer 211 may be formed by the same process as that of the black matrix 25 in the AA area, thereby reducing the processing complexity. The thickness of the light shielding layer 211 may be greater than or equal to 0.8 μm and less than or equal to 1.6 μm, for example, the thickness of the light shielding layer 211 is 1 μm.

Figure 3:
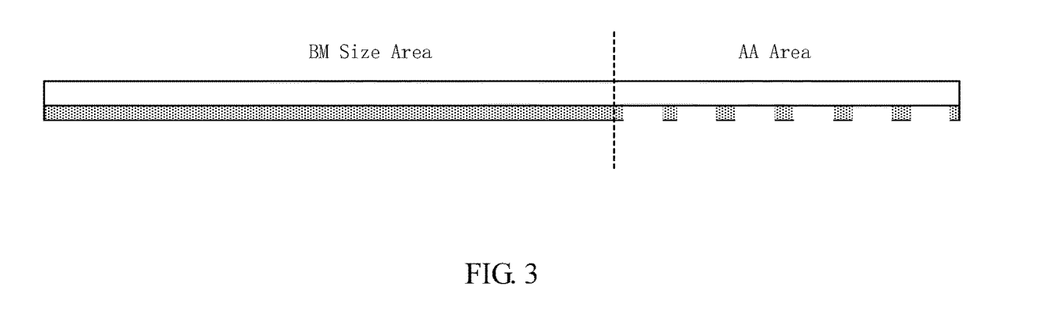
FIG. 3 is a schematic diagram illustrating a cross-sectional structure after a light shielding layer is manufactured in a color film substrate fabricating method provided in an embodiment of the present application.
Figure 4:
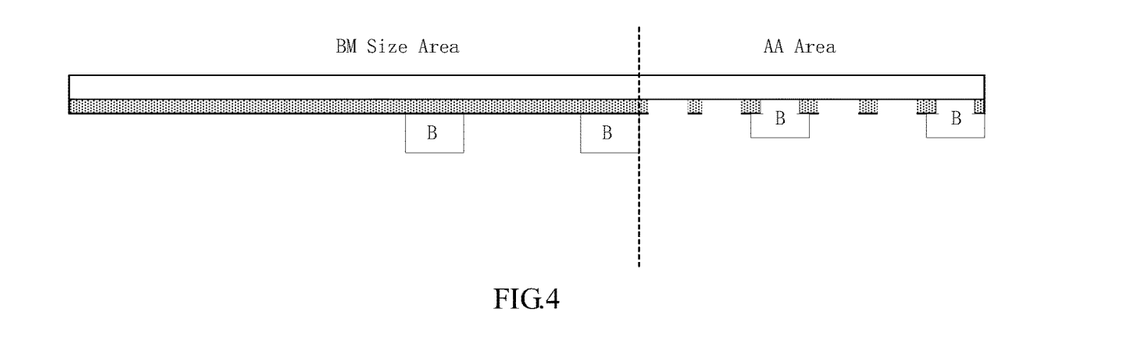
FIG. 4 is a schematic diagram illustrating a cross-sectional structure after a blue color resist layer is manufactured in a color film substrate fabricating method provided in an embodiment of the present application.
Figure 5:
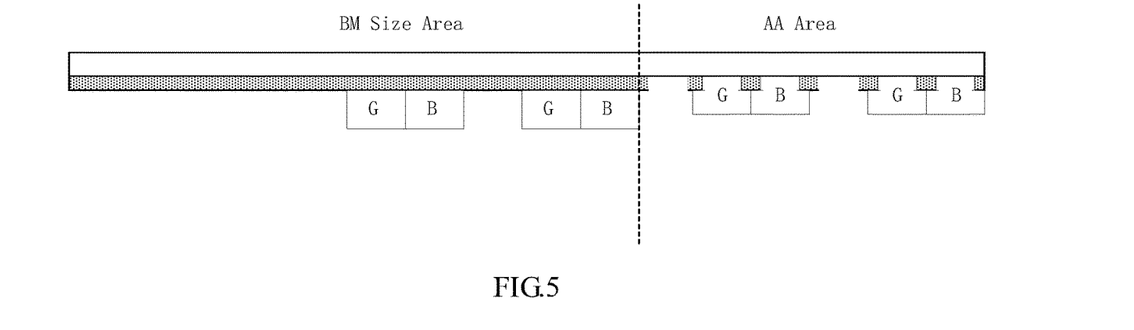
FIG. 5 shows is a schematic diagram illustrating a cross-sectional structure after a green color resist layer is manufactured in a color film substrate fabricating method provided in an embodiment of the present application.
Figure 6:
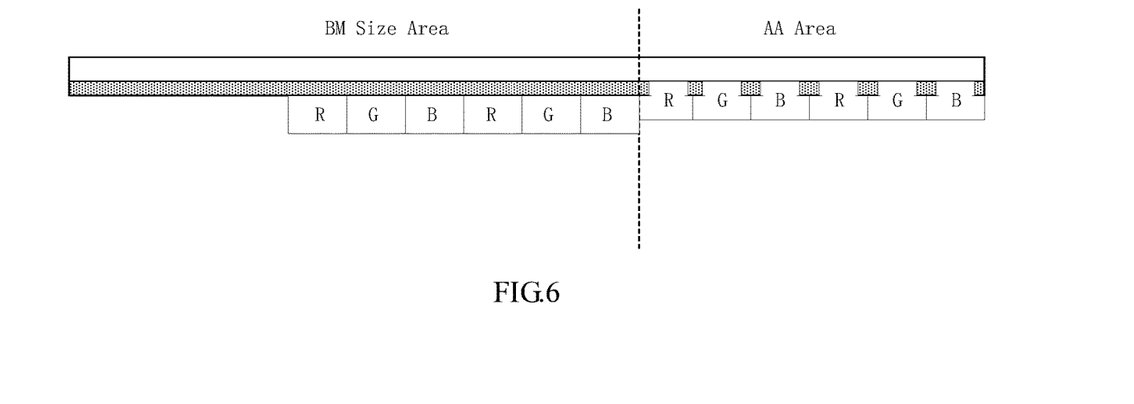
FIG. 6 is a schematic diagram illustrating a cross-sectional structure after a red color resist layer is manufactured in a color film substrate fabricating method provided in an embodiment of the present application.
Figure 7:
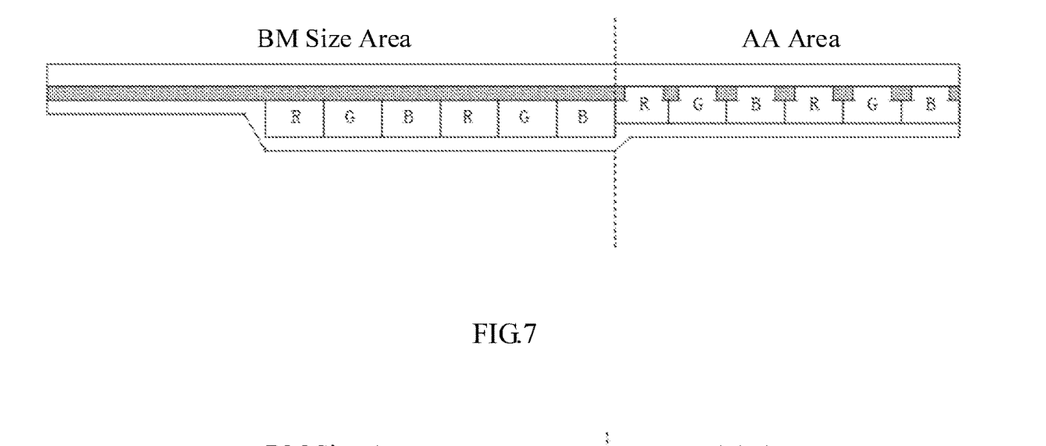
FIG. 7 is a schematic diagram illustrating a cross-sectional structure after a planarization layer is manufactured in a color film substrate fabricating method provided in an embodiment of the present application.
Figure 8:
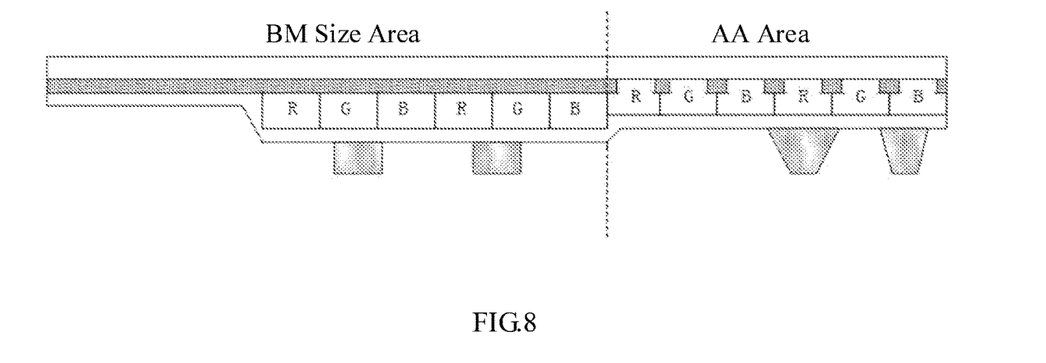
FIG. 8 is a schematic diagram illustrating a cross-sectional structure after a support layer is manufactured in a color film substrate fabricating method provided in an embodiment of the present application.

The material and thickness of the color resist layer 212 can be the same as those of the color resist layer 26 in the AA area, and the color resist layer 212 can be formed by the same process as that of the color resist layer 26 in the AA area, thereby reducing the processing complexity. The thickness of the color resist layer 212 may be greater than or equal to 1.5 μm and less than or equal to 2.5 μm, for example, the thickness of the color resist layer 212 is 2 μm. The color film substrate provided in this embodiment may be manufactured by the following steps:

manufacturing a light shielding layer on a base; FIG. 3 is a schematic diagram illustrating a cross-sectional structure after the light shielding layer is manufactured;

manufacturing a blue color resist layer on the light shielding layer; for example, a blue color resist layer B may be manufactured first in the AA area, and then a Mask is moved to the BM Size area to epitaxially manufacture the blue color resist layer B; FIG. 4 is a schematic diagram illustrating a cross-sectional structure after the blue color resist layer is manufactured; in FIG. 4, two columns of blue color resist layers B are formed in the BM Size area, and the number of columns of the blue color resist layers B in practical applications can be set according to actual conditions, for example, five columns of blue color resist layers B can be manufactured;

manufacturing a green color resist layer on the light shielding layer; for example, a green color resist layer G may be manufactured first in the AA area, and then the Mask is moved to the BM Size area to epitaxially manufacture the green color resist layer G; FIG. 5 is a schematic diagram illustrating a cross-sectional structure after the green color resist layer is manufactured; in FIG. 5, two columns of green color resist layers G are manufactured in the BM Size area, and the number of columns of green color resist layers G in practical applications can be set according to actual conditions, for example, five columns of green color resist layers G can be manufactured;

manufacturing a red color resist layer on the light shielding layer; for example, a red color resist layer R may be manufactured first in the AA area, and then the Mask is moved to the BM Size area to epitaxially manufacture the red color resist layer R; FIG. 6 is a schematic diagram illustrating a cross-sectional structure after the red color resist layer is manufactured; in FIG. 6, two columns of red color resist layers R are manufactured in the BM Size area, and the number of columns of the red color resist layers R in practical applications can be set according to actual conditions, for example, five columns of red color resist layers R can be manufactured;

coating a planarization layer on the color resist layer; FIG. 7 is a schematic diagram illustrating a cross-sectional structure after the planarization layer is manufactured;

manufacturing a support layer on the planarization layer to obtain the color film substrate; FIG. 8 is a schematic diagram illustrating a cross-sectional structure of the color film substrate after the support layer is manufactured.

It should be noted that, in the above fabricating method, the color resist layers in the BM Size area and the AA area are manufactured in steps by moving the mask, and in practical applications, the color resist layers in the BM Size area and the AA area can be manufactured simultaneously by using a large-Size mask.

In the color film substrate provided in this embodiment, the RGB color resist layers in the AA area are extended to the BM Size area, and the film layers in the BM Size area include the light shielding layer 211+ the color resist layer 212+ the planarization layer 22+ the support layer 23, so that the thickness of the CF substrate in the BM Size area is increased, and the total thickness of the photoresist layer 21, the planarization layer 22 and the support layer 23 on the color film substrate in the non-display region is greater than or equal to the first thickness threshold.

In the embodiment, the color resist layer 212 is extended to the BM Size area to increase the thickness of the color film substrate in the peripheral non-display region (BM Size area), and it can share the Mask with the color resist layer in the AA area in the manufacturing process, so that the mask cost can be saved, and meanwhile, the color resist layer 212 in the BM Size area can be formed by the same process as the color resist layer in the AA area, to simplify the process and reduce the processing complexity. By adding the color resist layer on the periphery of the color film substrate, the supporting force on the periphery of the display panel is improved, the amount of liquid crystal on the periphery is reduced at the same time, the deformation resistance of the Panel is enhanced, and the poor light leakage in a peripheral dark state is improved.

The present embodiment improves the peripheral light leakage problem from the following two aspects: on one hand, the fundamental cause of light leakage is that liquid crystal molecules arranged in the light leakage area are in disorder, resulting in uneven brightness in a deformed area and a non-deformation area of the screen under a dark state condition, so that poor light leakage occurs; in the present embodiment, by increasing the thickness of the color film substrate in the peripheral non-display region (BM Size area), the peripheral cell thickness of the display panel formed by the color film substrate and the array substrate in a cell-aligned manner is reduced, thereby reducing the amount of liquid crystal filled on the periphery, reducing a difference between cell thicknesses of the stressed area and the non-stressed area caused by the deformation of the display panel, and improving light leakage; on the other hand, by increasing the thickness of the color film substrate in the peripheral non-display region (BM Size area), the gap between the support layer and the array substrate in the display panel is reduced, even the support layer can be brought in contact with the array substrate, so that the amount of deformation of the display panel under an external pressure is reduced, to further improve light leakage.

Figure 9:
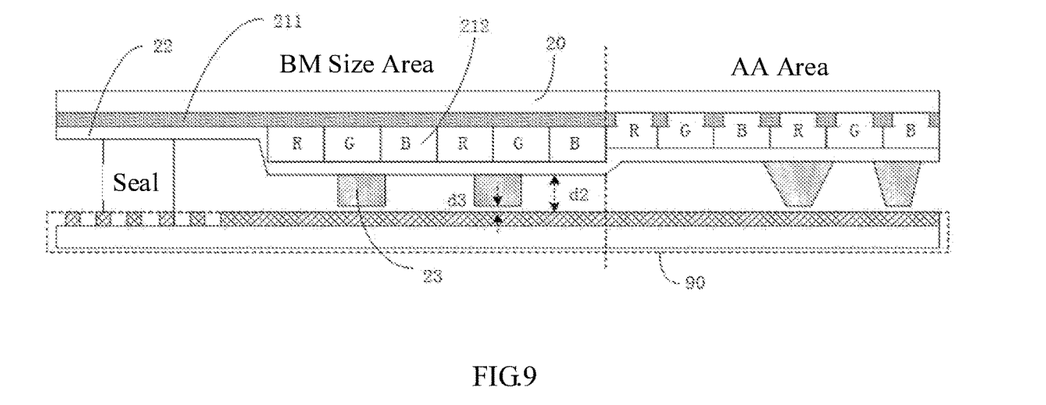
FIG. 9 is a schematic diagram illustrating a cross-sectional structure of a display device provided in an embodiment of the present disclosure.

Another embodiment of the present application further provides a display device, and referring to FIG. 9, the display device comprises an array substrate 90 and the color film substrate according to any of the above embodiments, which are arranged in a cell-aligned manner, and a liquid crystal layer filled between the array substrate and the color film substrate.

It should be noted that, the display device in the embodiment may be: any product or component with a display function such as a display panel, an electronic paper, a mobile phone, a tablet computer, a television, a notebook computer, a digital photo frame, a navigator.

The array substrate 90 may include a substrate (e.g., a glass substrate) and a plurality of thin film transistors etc., formed on the substrate.

When the photoresist layer in the color film substrate includes the light shielding layer and the color resist layer stacked on the base, the fabricating method of the corresponding display device may comprise the following steps:

manufacturing a light shielding layer on a base; FIG. 3 is a schematic diagram illustrating a cross-sectional structure after the light shielding layer is manufactured;

manufacturing a blue color resist layer on the light shielding layer; for example, a blue color resist layer B may be manufactured first in the AA area, and then a Mask is moved to the BM Size area to epitaxially manufacture the blue color resist layer B; FIG. 4 is a schematic diagram illustrating a cross-sectional structure after the blue color resist layer is manufactured; in FIG. 4, two columns of blue color resist layers B are formed in the BM Size area, and the number of columns of the blue color resist layers B in practical applications can be set according to actual conditions, for example, five columns of blue color resist layers B can be manufactured;

manufacturing a green color resist layer on the light shielding layer; for example, a green color resist layer G may be manufactured first in the AA area, and then the Mask is moved to the BM Size area to epitaxially manufacture the green color resist layer G; FIG. 5 is a schematic diagram illustrating a cross-sectional structure after the green color resist layer is manufactured; in FIG. 5, two columns of green color resist layers G are manufactured in the BM Size area, and the number of columns of green color resist layers G in practical applications can be set according to actual conditions, for example, five columns of green color resist layers G can be manufactured;

manufacturing a red color resist layer on the light shielding layer; for example, a red color resist layer R may be manufactured first in the AA area, and then the Mask is moved to the BM Size area to epitaxially manufacture the red color resist layer R; FIG. 6 is a schematic diagram illustrating a cross-sectional structure after the red color resist layer is manufactured; in FIG. 6, two columns of red color resist layers R are manufactured in the BM Size area, and the number of columns of the red color resist layers R in practical applications can be set according to actual conditions, for example, five columns of red color resist layers R can be manufactured;

coating a planarization layer on the color resist layer; FIG. 7 is a schematic diagram illustrating a cross-sectional structure after the planarization layer is manufactured;

manufacturing a support layer on the planarization layer to obtain the color film substrate; FIG. 8 is a schematic diagram illustrating a cross-sectional structure of the color film substrate after the support layer is manufactured;

coating a frame sealing glue, dripping liquid crystal, and cell-aligning with the array substrate to obtain the display device (display panel); FIG. 9 is a schematic diagram illustrating a cross-sectional structure of the display device after the cell-aligning.

According to the display device provided by the present embodiment, by increasing the thickness of the color film substrate in the non-display region, the peripheral cell thickness of the display device is reduced, thereby reducing the amount of liquid crystal filled on the periphery, reducing the cell thickness difference between the stressed area and the non-stressed area of the display device, and improving light leakage; in addition, the increase in the thickness of the color film substrate in the non-display region can reduce the gap between the support layer and the array substrate, improve the peripheral supporting force, enhance the deformation resistance of the display device and improve the poor light leakage in the peripheral dark state.

A distance d2 between a surface of the planarization layer of the color film substrate in the non-display region away from the base, and the array substrate is greater than or equal to the thickness of the support layer and less than or equal to a second thickness threshold, wherein the second thickness threshold may be less than or equal to 2.5 μm, for example, 2.0 μm, and a specific value of the second thickness threshold may be set according to actual conditions.

A distance d3 between a surface of the support layer of the color film substrate in the non-display region away from the base, and the array substrate is less than or equal to a third thickness threshold, wherein the third thickness threshold may be less than 0.2 μm, for example, 0.1 μm, and a specific value of the third thickness threshold may be set according to actual conditions.

The embodiments of the present application provide a color film substrate and a display device, wherein the color film substrate comprises a display region and a non-display region, and the color film substrate in the non-display region comprises: a base; and a photoresist layer disposed on the base; a planarization layer disposed on a side of the photoresist layer away from the base; a support layer disposed on a side of the planarization layer away from the base; wherein, a total thickness of the photoresist layer, the planarization layer and the support layer is greater than or equal to a first thickness threshold value. By increasing the thickness of the color film substrate in the non-display region, the peripheral cell thickness of the display panel formed by the color film substrate and the array substrate in a cell-aligned manner is reduced, thereby reducing the amount of liquid crystal filled on the periphery, reducing the cell thickness difference between the stressed area and the non-stressed area of the display panel, and improving light leakage; in addition, the increase in the thickness of the color film substrate in the non-display region can reduce the gap between the support layer and the array substrate, improve the peripheral supporting force, enhance the deformation resistance of the display panel and improve the poor light leakage in the peripheral dark state.

The various embodiments in the specification are all described in a progressive manner, and each embodiment focuses on differences from other embodiments, and portions that are the same or similar between the embodiments may be referred to each other.

Finally, it should also be noted that, in this specification, relational terms such as first and second, and the like are used solely to distinguish one entity or operation from another entity or operation without necessarily requiring or implying any actual such relationship or order between these entities or operations. Also, the terms "comprise" "include" or any other variation thereof, are intended to cover a non-exclusive inclusion, such that a process, method, article, or apparatus that comprises a list of elements comprises not only those elements but also other elements not expressly listed or inherent to such process, method, article, or apparatus. Without further limitations, an element defined by the phrase "comprising a ··· ···" does not exclude the presence of other identical elements in the process, method, article, or apparatus that comprises the element.

The color film substrate and the display device provided in the embodiments of the present invention are introduced in detail in the foregoing. A principle and an implementation manner of the present invention are described by using specific examples. The foregoing descriptions of the embodiments are merely for understanding the method and core ideas of the present disclosure. Meanwhile, persons of ordinary skill in the art may make modifications to the specific implementation manner and application scope according to the ideas of the present invention. To sum up, the content of the specification shall not be construed as a limitation to the present disclosure.

The invention claimed is:

1. A color film substrate comprising a display region and a non-display region,
   wherein the color film substrate in the non-display region comprises:
      a base,
      a photoresist layer disposed on the base,
      a planarization layer disposed on a side of the photoresist layer away from the base, and
      a support layer disposed on a side of the planarization layer away from the base,
   wherein the color film substrate in the display region comprises:
      the base,
      a color resist layer disposed on the base,
      a planarization layer disposed on a side of the color resist layer away from the base, and
      a support layer disposed on a side of the planarization layer away from the base,
   wherein a distance between an upper surface of the photoresist layer and a lower surface of the planarization layer in the non-display region is greater than a distance between an upper surface of the color resist layer and a lower surface of the planarization layer in the display region,
   wherein a total thickness of the photoresist layer, the planarization layer, and the support layer in the non-display region is greater than or equal to a first thickness threshold, and
   wherein the first thickness threshold value is equal to a total thickness of the color resist layer, the planarization layer and the support layer of the color film substrate in the display region, minus 1.1 μm.

2. The color film substrate according to claim 1, wherein a thickness of the planarization layer in the non-display region is larger than a thickness of the planarization layer in the display region.

3. The color film substrate according to claim 1, wherein the photoresist layer in the non-display region includes a light shielding layer and a color resist layer stacked on the base, wherein the light shielding layer is disposed close to the base.

4. The color film substrate according to claim 3, wherein a total thickness of the light shielding layer, the color resist layer and the planarization layer in the non-display region is larger than a total thickness of the color resist layer and the planarization layer in the display region.

5. The color film substrate according to claim 4, wherein the light shielding layer is a black matrix layer, the color film substrate in the display region comprises a black matrix disposed on the base and the color resist layer disposed on the base and the black matrix.

6. The color film substrate according to claim 3, wherein the color resist layer in the non-display region includes a red color resist layer, a green color resist layer, and a blue color resist layer.

7. The color film substrate according to claim 6, wherein the color resist layer is an integral layer.

8. The color film substrate according to claim 6, wherein the color resist layer comprises the red color resist layer, the green color resist layer, and the blue color resist layer, which are separated.

9. The color film substrate according to claim 3, wherein a thickness of the color resist layer is greater than or equal to 1.5 μm, and less than or equal to 2.5 μm.

10. The color film substrate according to claim 3, wherein a thickness of the light shielding layer is greater than or equal to 0.8 μm, and less than or equal to 1.6 μm.

11. The color film substrate according to claim 1, wherein a thickness of the planarization layer is greater than or equal to 0.5 μm, and less than or equal to 1.5 μm.

12. The color film substrate according to claim 1, wherein a thickness of the support layer is greater than or equal to 1 μm, and less than or equal to 2.5 μm.

13. The color film substrate according to claim 1, wherein the color film substrate in the display region comprises:
a black matrix disposed on the base and a color resist layer disposed on the base and the black matrix.

14. The color film substrate according to claim 13,
wherein a total thickness of the photoresist layer, the planarization layer, and the support layer in the non-display region is greater than or equal to a first thickness threshold, and wherein the first thickness threshold value is equal to a total thickness of the black matrix, the planarization layer and the support layer of the color film substrate in the display region.

15. A display device comprising an array substrate and the color film substrate according to claim 1, which are arranged in a cell aligned manner, and a liquid crystal layer filled between the array substrate and the color film substrate.

16. The display device according to claim 15, wherein the photoresist layer in the non-display region includes a light shielding layer and a color resist layer stacked on the base, wherein the light shielding layer is disposed close to the base, the light shielding layer is a black matrix layer, the color film substrate in the display region comprises a black matrix disposed on the base and the color resist layer disposed on the base and the black matrix.

17. The display device according to claim 16, wherein a total thickness of the light shielding layer, the color resist layer and the planarization layer in the non-display region is larger than a total thickness of the photoresist layer and the planarization layer in the display region.

18. The display device according to claim 17, wherein the color resist layer is an integral layer comprising a red color resist layer, a green color resist layer, and a blue color resist layer.

19. The display device according to claim 17, wherein the color resist layer comprises a red color resist layer, a green color resist layer, and a blue color resist layer, which are separated.

\* \* \* \* \*